United States Patent
Perlet et al.

(10) Patent No.: US 7,780,777 B2
(45) Date of Patent: Aug. 24, 2010

(54) DISPERSION CONTAINING TITANIUM DIOXIDE

(75) Inventors: Gabriele Perlet, Grosskrotzenburg (DE); Wolfgang Lortz, Waechtersbach (DE); Christoph Batz-Sohn, Hanau-Mittelbuchen (DE); Werner Will, Gelnhausen (DE); Sascha Reitz, Bruchkoebel (DE)

(73) Assignee: Evonik Degussa GmbH, Essen (DE)

( * ) Notice: Subject to any disclaimer, the term of this patent is extended or adjusted under 35 U.S.C. 154(b) by 657 days.

(21) Appl. No.: 11/572,018

(22) PCT Filed: Jul. 5, 2005

(86) PCT No.: PCT/EP2005/007210

§ 371 (c)(1),
(2), (4) Date: Jan. 12, 2007

(87) PCT Pub. No.: WO2006/010438

PCT Pub. Date: Feb. 2, 2006

(65) Prior Publication Data

US 2008/0098932 A1 May 1, 2008

(30) Foreign Application Priority Data

Jul. 30, 2004 (DE) .................. 10 2004 037 118

(51) Int. Cl.
- C23C 16/40 (2006.01)
- C09C 1/36 (2006.01)
- C01G 23/047 (2006.01)

(52) U.S. Cl. .................. 106/287.19; 106/436; 423/610

(58) Field of Classification Search ............ 106/287.19, 106/436

See application file for complete search history.

(56) References Cited

U.S. PATENT DOCUMENTS 2,819,174 A 1/1958 Vartanian (Continued)

FOREIGN PATENT DOCUMENTS

EP 0 063 699 11/1982

(Continued)

OTHER PUBLICATIONS

U.S. Appl. No. 60/405,739, filed Aug. 26, 2002, Lortz, et al.

(Continued)

*Primary Examiner*—Jerry Lorengo
*Assistant Examiner*—Joseph V Micali
(74) *Attorney, Agent, or Firm*—Oblon, Spivak, McClelland, Maier & Neustadt, L.L.P.

(57) ABSTRACT

An aqueous dispersion that can be used in the coating of glass, ceramics and metal surfaces is prepared by placing, in water, an aggregated titanium dioxide powder having a specific surface area of from 20 to 150 $m^2/g$ in such an amount that the desired dispersion contains at least 20 wt. % titanium dioxide, and at least one amino alcohol having from 1 to 6 carbon atoms, and at least one carboxylic acid selected from dibasic carboxylic acids and/or hydroxycarboxylic acids having from 2 to 6 carbon atoms. A pre-dispersion is produced by introducing energy in an amount of less than 200 $kJ/m^3$. Then a dispersion is produced in which the aggregated titanium dioxide powder has a mean, volume-related aggregate diameter of less than 150 nm by grinding the pre-dispersion with a high-energy mill at a pressure of at least 500 bar.

12 Claims, 1 Drawing Sheet

U.S. PATENT DOCUMENTS

Figure 1:
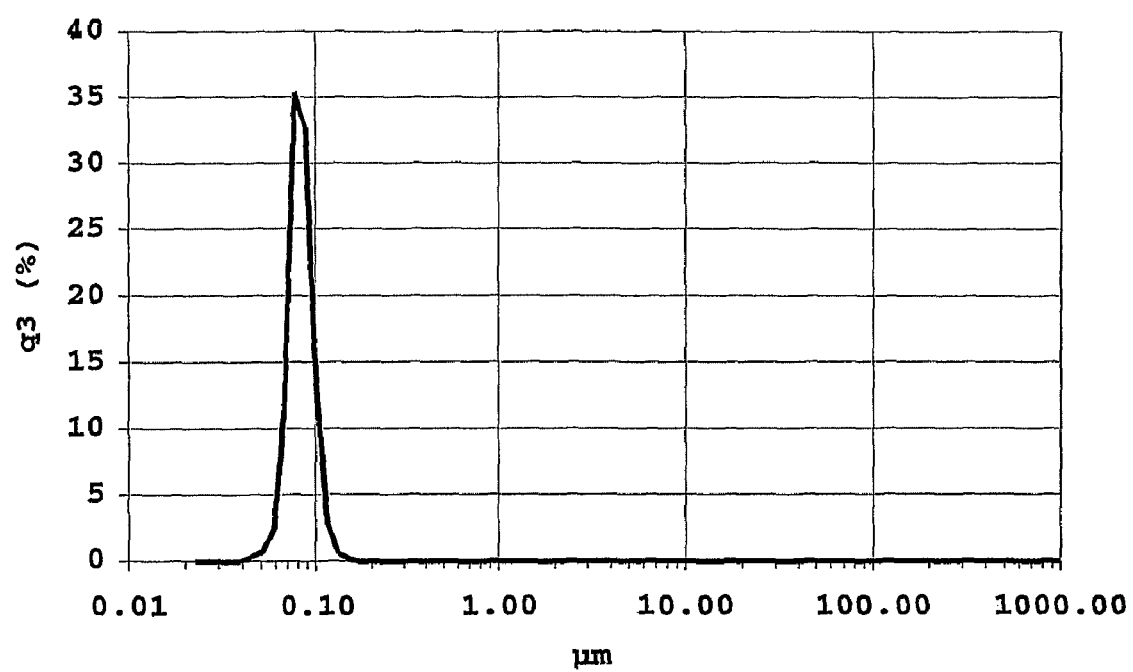

| | | |
|---|---|---|
| 6,610,135 B1 | 8/2003 | Ohmori et al. |
| 6,663,683 B2 | 12/2003 | Lortz et al. |
| 6,676,719 B2 | 1/2004 | Lortz et al. |
| 6,740,312 B2 * | 5/2004 | Chopin et al. .................. 424/59 |
| 6,767,377 B2 | 7/2004 | Schumacher et al. |
| 6,808,769 B2 | 10/2004 | Batz-Sohn et al. |
| 6,991,190 B2 | 1/2006 | Lortz et al. |
| 7,015,270 B2 | 3/2006 | Scharfe et al. |
| 7,169,322 B2 | 1/2007 | Menzel et al. |
| 7,374,787 B2 | 5/2008 | Lortz et al. |
| 7,470,423 B2 | 12/2008 | Lortz et al. |
| 2004/0240062 A1 | 12/2004 | Lortz et al. |
| 2005/0169861 A1 | 8/2005 | Lortz et al. |
| 2006/0104881 A1 | 5/2006 | Lortz et al. |
| 2006/0163533 A1 | 7/2006 | Batz-Sohn et al. |
| 2006/0193764 A1 | 8/2006 | Katusic et al. |
| 2007/0048205 A1 | 3/2007 | Katusic et al. |
| 2008/0051473 A1 | 2/2008 | Lortz et al. |
| 2008/0264299 A1 | 10/2008 | Lortz et al. |

FOREIGN PATENT DOCUMENTS

| | | |
|---|---|---|
| WO | 98/51751 | 11/1998 |
| WO | 01/60925 | 8/2001 |

OTHER PUBLICATIONS

U.S. Appl. No. 11/722,122, filed Jun. 19, 2007, Oswald, et al.
U.S. Appl. No. 12/097,300, filed Jun. 13, 2008, Lortz, et al.
U.S. Appl. No. 11/910,668, filed Mar. 8, 2006, Kroll, et al.
U.S. Appl. No. 60/708,401, filed Aug. 16, 2005, Katusic, et al.
U.S. Appl. No. 60/940,908, filed May 30, 2007, Kroell, et al.
U.S. Appl. No. 12/271,414, filed Nov. 14, 2008, Wursche, et al.
U.S. Appl. No. 10/580,325, filed May 24, 2006, Schumacher, et al.

* cited by examiner

DISPERSION CONTAINING TITANIUM DIOXIDE

The invention relates to an aqueous dispersion which comprises titanium dioxide powder, an alcohol amine and a carboxylic acid.

Titanium dioxide is widely used in the field of ceramics. For example, roofing tiles or floor tiles are coated with titanium dioxide in order thereby to obtain self-cleaning properties, which are caused by the photocatalytic activity of the titanium dioxide.

The titanium dioxide can be applied, for example, by sol-gel processes, as described in EP-A-590477.

DE-A-10324519 describes a process in which a dispersion of a photocatalytically active metal oxide powder having a specific surface area of from 25 $m^2/g$ to 200 $m^2/g$ is applied to an oxide ceramics base material to form a layer, and the layer is then cured to form a porous oxide ceramics coating having photocatalytic activity. The photocatalytically active metal oxide powder used is preferably titanium dioxide, which is obtained by flame hydrolysis of $TiCl_4$. The primary particles of such powders usually have a size of from about 15 nm to about 30 nm. For example, titanium dioxide P25, Degussa, can be used.

DE-A-10324519 does not disclose what properties the metal oxide dispersion is required to have in order to be suitable as a coating material. It is merely described that it must contain extenders and/or bonding agents. As extenders there are preferably used organic viscosity regulators, for example carboxymethylcellulose. These viscosity regulators are necessary to impart a suitable viscosity to the suspension so that it can reliably be applied to the ceramics base material in the desired layer thickness.

From DE-A-10229761 there are further known metal oxide dispersions which contain phosphates or polyphosphates. Such dispersions are not suitable as a coating material for ceramics supports because the (poly)phosphates, in contrast to organic additives, are not removed on tempering of the coating.

EP-A-981584 describes a process for the preparation of a dispersion which has a solids content of titanium dioxide pigment of at least 78 wt. % and of aluminium oxide of at least 3 wt. %. The dispersion is generally diluted for transportation and, before being used further, is ground further in order to reduce the size of the titanium dioxide particles.

EP-A-850203 describes a dispersion which contains monodisperse, porous titanium dioxide particles in organic solvents and which is used for coating substrates. The preparation of this dispersion is complex. The titanium dioxide particles are first produced by hydrolysis of an organotitanium compound in the presence of carboxylates or phosphates in an aqueous medium, are separated off by filtration and are then re-dispersed in an organic solvent. The titanium dioxide content of the organic dispersion may be up to 300 g/l.

The object of the invention is to provide a dispersion comprising a photocatalytically active metal oxide component, which dispersion, while having a high solids content, has a low viscosity and does not contain any further inorganic constituents other than the photocatalytically active metal oxide component. Moreover, the dispersion should be pourable at room temperature and should be stable to sedimentation and thickening for at least one month. A further object of the invention is to provide a process for the preparation of the dispersion.

The invention provides an aqueous dispersion obtainable by placing in water an aggregated titanium dioxide powder having a specific surface area of from 20 to 150 $m^2/g$ in such an amount that the desired dispersion comprises at least 20 wt. % titanium dioxide, and at least one amino alcohol having from 1 to 6 carbon atoms, and at least one carboxylic acid from the group comprising dibasic carboxylic acids and/or hydroxycarboxylic acids having from 2 to 6 carbon atoms, the amino alcohol being present in the dispersion in an amount of from 2.5 to 7.0 $\mu mol./m^2$ specific surface area $TiO_2$ and the carboxylic acid being present in an amount of from 1.0 to 3.5 $\mu mol./m^2$ specific surface area $TiO_2$, producing a pre-dispersion by introducing energy in an amount of less than 200 $kJ/m^3$ and then producing a dispersion in which the aggregated titanium dioxide powder has a mean, volume-related aggregate diameter of less than 150 nm by grinding the pre-dispersion by means of a high-energy mill at a pressure of at least 500 bar.

The origin of the aggregated titanium dioxide powder is not critical. A pyrogenically prepared titanium dioxide can advantageously be used. Pyrogenically is here to be understood as meaning a powder obtainable by flame hydrolysis or flame oxidation. The powders so prepared consist of aggregates of caked primary particles, which are formed first during the reaction. A plurality of aggregates may subsequently form agglomerates. Owing to the reaction conditions, pyrogenically prepared powders exhibit only very low surface porosity and hydroxyl groups at the surface, up to 5 $OH/nm^2$.

Pyrogenically prepared titanium dioxide powders within the scope of the invention also include doped titanium dioxide powders or metal oxide-titanium dioxide mixed oxide powders, in each of which at least a portion of the doping component or of the metal oxide component is present at the surface. Suitable doping and metal oxide components are especially the oxides of aluminium, silicon, cerium, iron, copper or zirconium. The amount of doping component or metal oxide component, based on the powder, may preferably be from 10 ppm to 20 wt. %.

The dispersion according to the invention may further also comprise pyrogenically prepared metal oxide powders which have subsequently been covered with a titanium dioxide shell.

Preference is given within the scope of the invention, however, to powders that contain titanium dioxide as the single component. These may be, for example, Aeroxide® P25 (Degussa) with a BET surface area of about 50 $m^2/g$, and Aeroxide® P90 with a BET surface area of about 90 $m^2/g$ (Degussa).

It is further possible for a pyrogenically prepared titanium dioxide powder that has a narrow primary particle distribution to be present in the dispersion according to the invention. Such a powder is characterised by a BET surface area of from 20 to 200 $m^2/g$, a half-width value HV, in nanometers, of the primary particle distribution with values according to the formula $HV = a \times BET^f$ where $a = 670 \times 10^9$ $m^3/g$ and $-1.3 \leq f \leq -1.0$ and an amount of particles having a diameter of more than 45 μm in a range from 0.0001 to 0.05 wt. %.

The preparation of the powder is described in the German patent application having the file reference 10357508.1 and the filing date Mar. 12, 2003.

Particular preference is given to a dispersion according to the invention in which the titanium dioxide powder has a specific surface area of 50±15 $m^2/g$ or 90±15 $m^2/g$.

The titanium dioxide powders present in the dispersion according to the invention may be in rutile or anatase form or in the form of a mixture of the two forms. When pyrogenically prepared titanium dioxide powders are used, rutile and anatase modifications are generally present. The anatase/rutile ratio may be in a range from 2:98 to 98:2. The range may particularly preferably be from 70:30 to 95:5. Anatase has a lower hardness compared to rutile. Rutile, on the other hand, has a higher refractive index and better resistance to weathering.

On account of the different properties of rutile and anatase it is possible to prepare dispersions according to the invention for specific applications. Accordingly, rutile-rich dispersions can preferably be used in cases where resistance to UV light is important. Anatase-rich dispersions can be used in cases where low abrasion is important.

It may further be advantageous if the dispersion according to the invention exhibits monomodal distribution of the aggregate diameters, which means that only one signal is obtained on analysis of the aggregate diameter distribution.

It may be particularly advantageous if the mean, volume-related aggregate diameter is less than 100 nm and no particles greater than 200 nm are detectable in the dispersion according to the invention by the conventional methods of light scattering for determining particle size distributions in dispersions, such as, for example, dynamic (e.g. Malvern Zetasizer) or random light scattering (e.g. Horiba LA-910).

The amino alcohols in the dispersion according to the invention are preferably selected from the group comprising monoethanolamine, diethanolamine, triethanolamine, monoisopropanolamine, diisopropanolamine, triisopropanolamine, N,N-dimethylisopropanolamine, 3-amino-1-propanol, 1-amino-2-propanol and/or 2-amino-2-methyl-1-propanol, particular preference being given to 2-amino-2-methyl-1-propanol.

The carboxylic acids in the dispersion according to the invention are preferably selected from the group comprising the dibasic carboxylic acids or hydroxycarboxylic acids oxalic acid, malonic acid, succinic acid, glutaric acid, adipic acid, maleic acid, fumaric acid, lactic acid, malic acid, tartaric acid and/or citric acid, citric acid being particularly preferred.

In the dispersion according to the invention, the content of amino alcohol and of at least dibasic carboxylic acid or hydroxycarboxylic acid is from 2.5 to 7.0 $\mu$mol./m$^2$ specific surface area $TiO_2$ for amino alcohol and from 1.0 to 3.5 $\mu$mol./m$^2$ specific surface area $TiO_2$ for the carboxylic acid. In a preferred embodiment, the content of amino alcohol and of at least dibasic carboxylic acid or hydroxy-carboxylic acid may be from 3.3 to 5.0 $\mu$mol./m$^2$ specific surface area $TiO_2$ for amino alcohol and from 1.5 to 2.5 $\mu$mol./m$^2$ specific surface area $TiO_2$ for the carboxylic acid.

The dispersion according to the invention may preferably have a content of titanium dioxide powder in the dispersion of from 25 to 50 wt. %.

The dispersion according to the invention may optionally comprise at least one preservative. Suitable preservatives may be:
  aqueous formulations of 2-methylisothiazolin-3-one (MIT) and benzisothiazolinone (BIT), MIT/BIT and 2-bromo-2-nitro-propane-1, 3-diol, 3(2H)-5-chloro-2-methyl-isothiazolone (CIT)/MIT,
  formaldehyde donors based on dimethylol-or trimethylol-urea, formamide methylol, paraformaldehyde,
  bronopol, nitrilodibromopropionamide 1,3-di(hydroxymethyl)-5,5-dimethylhydantoin or hexahydrotriazines.

The preservative is usually present in an amount of from 0.5 to 5 wt. %, based on the total amount of the formulation. In the dispersion according to the invention, from 0.05 to 0.4 wt. % of the formulation, based on the total amount of the dispersion, may be present.

Preservatives from the foodstuffs sector, such as, for example, sorbic acid/alkali sorbates, propionic acid, benzoic acid/alkali benzoates, PHB esters, alkali sulfites, may also be present in the dispersion according to the invention, usually in an amount of from 0.1 to 0.5 wt.%, based on the total amount of the dispersion.

The invention further provides a process for the preparation of the dispersion according to the invention, in which aggregated titanium dioxide powder, corresponding to the desired amount in the dispersion, at least one amino alcohol and at least one carboxylic acid are placed in water, a pre-dispersion is produced by introduction of energy in an amount of less than 1000 kJ/m$^3$, the pre-dispersion is divided into at least two partial streams, these partial streams are placed under a pressure of at least 500 bar in a high-energy mill, are let off via a nozzle and are allowed to come together in a gas-or liquid-filled reaction space, and a preservative is optionally added.

Suitable dispersing devices for the preparation of the pre-dispersion are, for example, rotor/stator machines or toothed disks.

In a preferred embodiment, the pressure is at least 2000 bar. Furthermore, it may be advantageous to expose the dispersion to the high-energy grinding process several times.

The invention relates further to the use of the dispersion according to the invention in the coating, in particular the transparent coating, of glass and ceramics and metal surfaces.

EXAMPLES

Materials Used:

The titanium dioxide powder used in Examples 1 and 5-8 is Aeroxide®TiO$_2$ P25 and that used in Example 2 is Aeroxide®TiO$_2$ P90, both from Degussa AG.

The titanium dioxide powders used in Examples 3 and 4 are prepared as follows:

Titanium dioxide powder used in Example 3: 160 kg/h of TiCl$_4$ are vaporised in a vaporiser at 140° C. The vapours are transferred into a mixing chamber by means of 15 Nm$^3$/h of nitrogen as carrier gas with a carrier gas moisture content of 15 g/m$^3$ carrier gas. Separately therefrom, 52 Nm$^3$/h of hydrogen and 525 Nm$^3$/h of primary air are introduced into the mixing chamber. In a central pipe, the reaction mixture is fed to a burner and ignited. The flame burns in a water-cooled flame tube. 200 Nm$^3$/h of secondary air are additionally introduced into the reaction space. The resulting powder is separated off in a downstream filter and then treated counter-currently with air and steam at 520° C.

The titanium dioxide powder has the following physico-chemical properties: BET surface area 48 m /g, half-width value of the primary particles 11.0 nm, anatase content 89%.

Titanium dioxide powder used in Example 4: 40 kg/h of TiCl$_4$ are vaporised in a vaporiser at 140° C. The vapours are transferred into a mixing chamber by means of 15 Nm$^3$/h of nitrogen as carrier gas with a carrier gas moisture content of 6 g/m$^3$ carrier gas. Separately therefrom, 67 Nm$^3$/h of hydrogen and 550 Nm$^3$/h of primary air are introduced into the mixing chamber. In a central pipe, the reaction mixture is fed to a burner and ignited. The flame burns in a water-cooled flame tube. 200 Nm$^3$/h of secondary air are additionally introduced into the reaction space. The resulting powder is separated off in a downstream filter and then treated counter-currently with air and steam at 520° C.

The titanium dioxide powder has the following physico-chemical properties: BET surface area 91 m²/g, half-width value of the primary particles 4.8 nm, anatase content 90%.

General procedure for the preparation of the dispersion according to the invention: Citric acid and water are placed in a reaction vessel. The amino alcohol is added proportionally to the added amount of powder in order to obtain a flowable pre-dispersion. To that end, the titanium dioxide powder is drawn in via the suction pipe of an Ystral Conti-TDS 3 under shear conditions and, when drawing in is complete, is then subjected to shear for 15 minutes at 3000 rpm.

This pre-dispersion is fed in two passes through a Sugino Ultimaizer HJP-25050 high-energy mill at a pressure of 2500 bar and with diamond nozzles having a diameter of 0.3 mm.

Table 1 shows the materials and the amounts thereof used in the examples carried out according to the general procedure. Table 1 further contains the physico-chemical data of the resulting dispersions.

FIG. 1 shows the particle size distribution (measured using a Horiba LA 910) of the dispersion according to the invention from Example 1 after grinding twice by means of a high-energy mill at 2500 bar. The mean, volume-related aggregate diameter is 75 nm. Moreover, the diagram shows no signals.

Examples 5 and 6 show that amino alcohol and carboxylic acid are necessary for preparing the dispersion according to the invention. If a component is omitted, a highly viscous, inhomogeneous pre-dispersion is obtained, which is not suitable for further grinding.

Examples 7 and 8 show that the amount of amino alcohol and carboxylic acid is critical for obtaining a dispersion according to the invention. In these examples, the amount of one component in each case is outside the claimed range. The resulting viscosities of the pre-dispersion make further processing in a high-energy mill impossible.

Furthermore, high-energy grinding is fundamental to obtaining the dispersion according to the invention. If the materials as described in Example 1 are chosen but high-energy grinding is not carried out, a highly viscous dispersion of low stability and having a mean aggregate size of more than 150 nm is obtained.

The dispersions according to the invention of Examples 1 to 4 exhibit extremely low viscosity values while having excellent stability.

TABLE 1

Materials/amounts used and physico-chemical data of the dispersions

| Example | | according to the invention | | | | Comparative examples | | | |
|---|---|---|---|---|---|---|---|---|---|
| | | 1 | 2 | 3 | 4 | 5 | 6 | 7 | 8 |
| TiO₂ powder | kg | 47.2 | 22.5 | 54.2 | 25.3 | 47.2 | 47.2 | 47.2 | 47.2 |
| Demin. Water | kg | 69.2 | 50.7 | 68.2 | 52.7 | 70 | 70 | 69.2 | 69.2 |
| Citric acid | kg | 0.79 | 0.81 | 0.82 | 0.81 | 0 | 1.41 | 0.19 | 0.79 |
| 2-Amino-2-methyl-1-propanol | kg | 0.79 | 0.7 | 1.21 | 0.61 | 0.79 | 0 | 0.79 | 0.19 |
| Total | kg | 117.98 | 74.71 | 124.43 | 79.42 | 117.99 | 118.61 | 117.38 | 117.38 |
| TiO₂ content | wt. % | 40.0 | 30.1 | 43.6 | 31.9 | 40.0 | 39.8 | 40.2 | 40.2 |
| Diameter$^{(\S)}$ | nm | 75 | 80 | 78 | 81 | — | — | >200 | >200 |
| BET TiO₂ | m2/g | 50 | 90 | 48 | 91 | 50 | 50 | 50 | 50 |
| Citric acid | μmol./m² TiO₂ | 1.74 | 2.08 | 1.64 | 1.83 | 0.00 | 1.73 | 0.23 | 1.74 |
| 2-Amino-2-methyl-1-propanol | μmol./m² TiO₂ | 3.76 | 3.88 | 5.22 | 2.97 | 3.76 | 0.00 | 3.76 | 0.90 |
| Viscosity (23° C.) | | | | | | | | | |
| Shear rate 10 s⁻¹ | mPas | 40 | 960 | 256 | 1145 | — | — | 22,260 | 18,198 |
| 1000 s⁻¹ | mPas | 31 | 70 | 45 | 97 | — | — | 2540 | 1730 |
| Stability | months | >6 | >6 | >6 | >6 | — | — | — | — |

$^{(\S)}$= mean volume-related aggregate diameter; determined using a Horiba LA 910;

The invention claimed is:

1. A process for the preparation of an aqueous dispersion, said process comprising:

placing
  an aggregated titanium dioxide powder, corresponding to a desired amount in the dispersion,
  at least one amino alcohol and
  at least one carboxylic acid are placed in water, producing a pre-dispersion by introduction of energy in an amount of less than 1000 kJ/m³, dividing the pre-dispersion into at least two partial streams, placing said partial streams under a pressure of at least 500 bar in a high-energy mill, venting said partials streams via a nozzle, allowing said partial streams to come together in a gas-or liquid-filled reaction space, and optionally adding a preservative;

wherein said aggregated titanium dioxide powder has a specific surface area of from 20 to 150 m²/g and is added in such an amount that the desired dispersion comprises at least 20 wt. % titanium dioxide, wherein said at least one amino alcohol has from 1 to 6 carbon atoms, wherein said at least one carboxylic acid is selected from the group consisting of a dibasic carboxylic acid having from 2 to 6 carbon atoms, a hydroxycarboxylic acid having from 2 to 6 carbon atoms, and mixtures thereof, wherein, in said dispersion, the aggregated titanium dioxide powder has a mean, volume-related aggregate diameter of less than 150 nm, wherein said dispersion comprises the amino alcohol in an amount of from 2.5 to 7.0 μmol/m² of specific surface area $TiO_2$, and wherein said dispersion comprises the carboxylic acid in an amount of from 1.0 to 3.5 μmol/m² of specific surface area $TiO_2$.

2. The process according to claim 1, wherein the titanium dioxide powder has been prepared pyrogenically.

3. The process according to claim 1, wherein the titanium dioxide powder has a specific surface area of 50±15 m²/g or 90±15 m²/g.

4. The process according to claim 1, wherein the rutile/anatase ratio of the titanium dioxide powder is in a range from 2:98 to 98:2.

5. The process according to claim 1, wherein the titanium dioxide powder in the dispersion exhibits a monomodal distribution of the aggregate diameters.

6. The process according to claim 1, wherein the mean, volume-related aggregate diameter of said aggregated titanium dioxide powder is less than 100 nm and no particles greater than 200 nm are detectable by scattered-light measurement.

7. The process according to claim 1, wherein the amino alcohol is selected from the group consisting of monoethanolamine, diethanolamine, triethanolamine, monoisopropanolamine, diisopropanolamine, triisopropanolamine, N,N-dimethylisopropanolamine, 3-amino-1-propanol, 1-amino-2-propanol, 2-amino-2-methyl-1-propanol and mixtures thereof.

8. The process according to claim 1, wherein the carboxylic acid or hydroxycarboxylic acid is selected from the group consisting of oxalic acid, malonic acid, succinic acid, glutaric acid, adipic acid, maleic acid, fumaric acid, lactic acid, malic acid, tartaric acid, citric acid and mixtures thereof.

9. The process according to claim 1, wherein the content of amino alcohol in the dispersion is from 3.3 to 5.0 μmol/m² of specific surface area $TiO_2$, and the content of carboxylic acid in the disersion is from 1.5 to 2.5 μmol/m² of specific surface area $TiO_2$.

10. The process according to claim 1, wherein the content of titanium dioxide powder in the dispersion is from 25 to 50 wt. %.

11. The process according to claim 1, wherein said dispersion comprises at least one preservative.

12. The process according to claim 1, wherein said predispersion is produced by introducing energy in an amount of less than 200 kJ/m³.

* * * * *